United States Patent [19]
Gwin

[11] 3,933,330
[45] Jan. 20, 1976

[54] LATCH MECHANISM
[75] Inventor: Edward S. Gwin, Bloomfield Hills, Mich.
[73] Assignee: General Motors Corporation, Detroit, Mich.
[22] Filed: Oct. 15, 1974
[21] Appl. No.: 514,753

Related U.S. Application Data
[62] Division of Ser. No. 419,771, Nov. 28, 1973, Pat. No. 3,879,082.

[52] U.S. Cl. .................. 248/371; 292/27; 297/326
[51] Int. Cl.² ................................................. B60N 1/04
[58] Field of Search .......... 248/371, 372, 382, 383, 248/384; 297/332, 333, 335, 326; 24/230 AT, 233, 234, 235; 292/27, 29, 46, 49, 52, 98, 124

[56] References Cited
UNITED STATES PATENTS

| | | | |
|---|---|---|---|
| 550,189 | 11/1895 | Melka | 24/235 |
| 1,471,001 | 10/1923 | Nicholson | 296/65 R |
| 2,667,778 | 2/1954 | Schmitt | 292/27 |
| 2,784,475 | 3/1957 | Schmitt | 24/230 AT |
| 3,179,997 | 4/1965 | Jalinaud | 24/230 AT |
| 3,453,014 | 7/1969 | Johnson | 292/124 |
| 3,827,747 | 8/1974 | Cookes | 248/371 |

Primary Examiner—Roy D. Frazier
Assistant Examiner—Robert A. Hafer
Attorney, Agent, or Firm—Edward J. Biskup

[57] ABSTRACT

A latch mechanism for use with a tiltable seat having the forward end thereof supported by a base for movement about a transverse horizontal axis. The latch mechanism includes a pair of overlapping lock members pivotally interconnected for relative movement in a scissors fashion with each lock member having a lower portion formed as a J-shaped hook and an upper portion having an opening therein. A spring urges the lower portions of the lock members towards each other into a locked position with the base and a release member having an inner end extending into the openings in the upper portions of the lock members causes the lower portions to be spread apart against the bias of the spring so as to place the lock members in an unlocked position.

1 Claim, 9 Drawing Figures

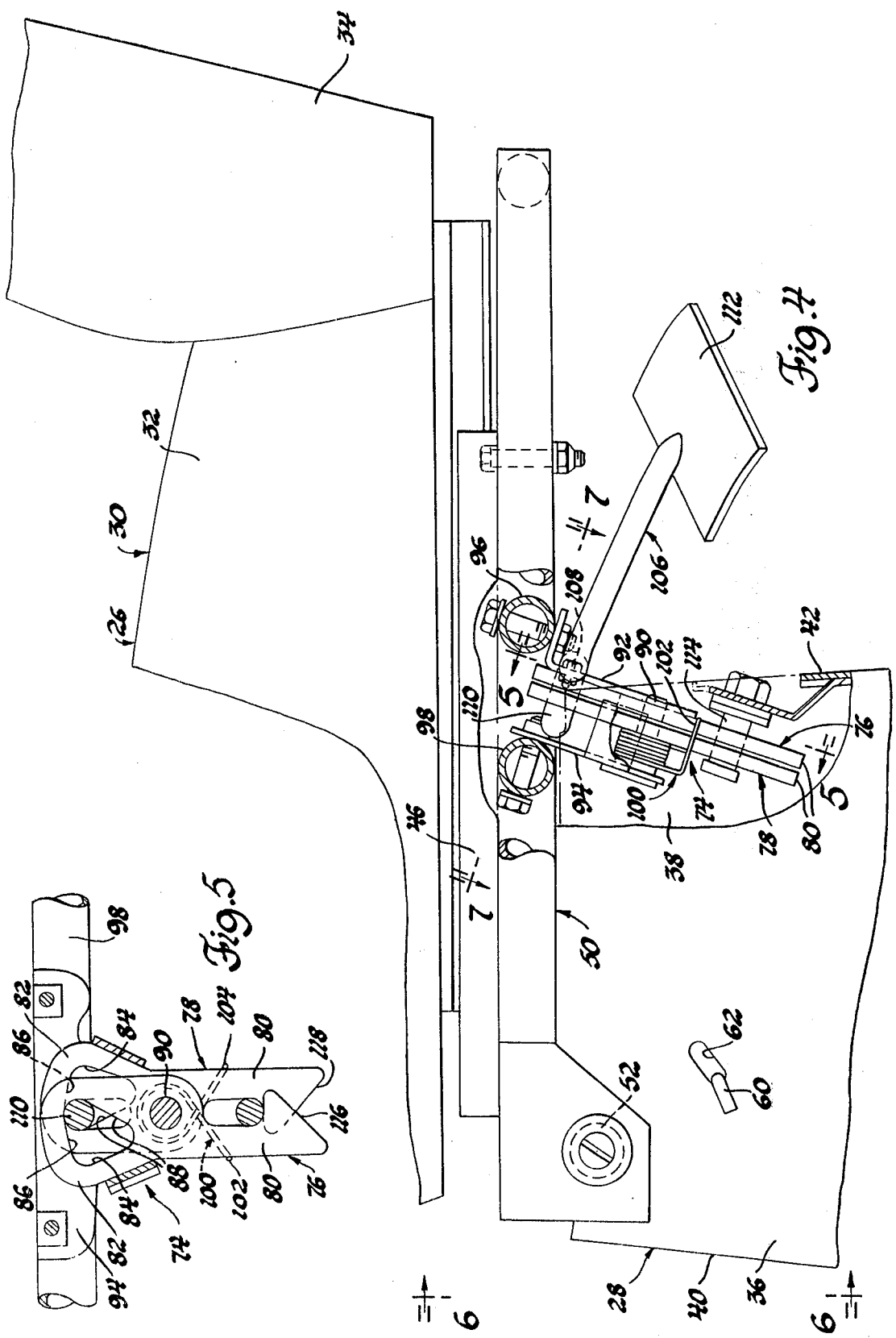

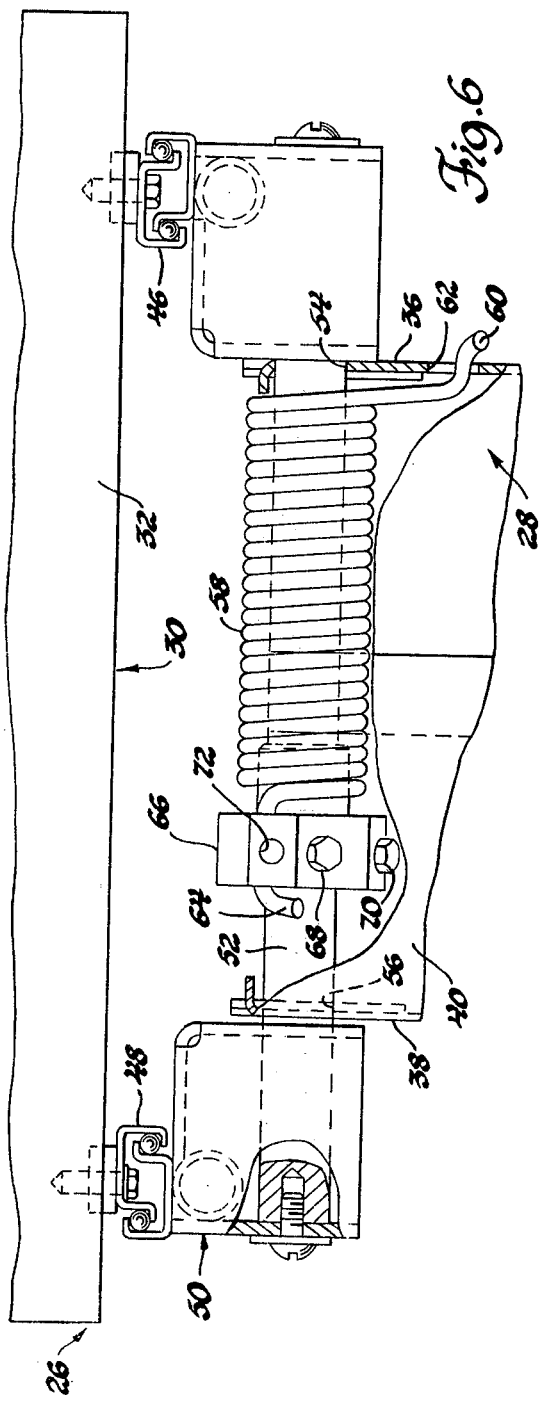
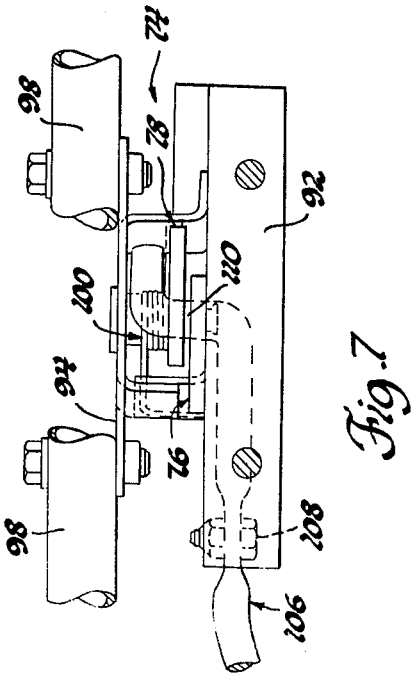
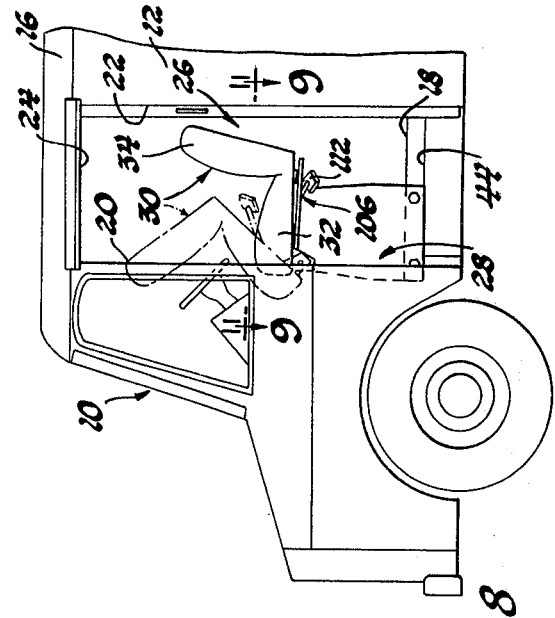
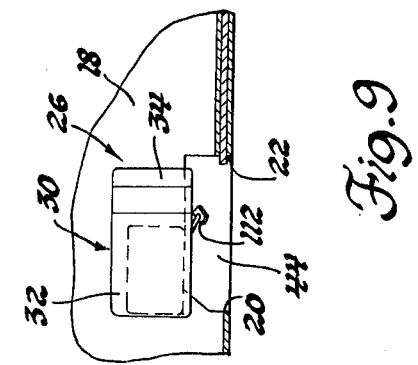

LATCH MECHANISM

This is a division of U.S. Ser. No. 419,771, filed on Nov. 28, 1973, now Pat. No. 3,879,082.

This invention concerns a vehicle seat assembly of the type in which the seat is mounted on a pedestal and is supported adjacent its forward edge for pivotal movement about a transverse horizontal axis. The seat assembly is designed for use with a motor vehicle van and is intended to permit the driver to unlock a knee-operated latch mechanism for automatically causing the seat to pivot towards the steering wheel and thereby increase the space available for gaining access to the interior of the vehicle.

In the preferred form, the seat assembly according to the invention is incorporated with a motor vehicle van having a body which includes a pair of side walls, a roof, and a floor portion for cargo. A door opening is formed in one of the side walls and is defined by horizontally spaced front and rear vertical edges and vertically spaced upper and lower horizontal edges. A pedestal has its lower end rigidly mounted on the floor portion in transverse alignment with the door opening while the upper end of the pedestal supports a seat. The floor portion adjacent the door opening is formed with a step for entering the vehicle and the seat comprises a seat cushion member and a seat back member. The seat cushion member is connected through a transverse shaft to the pedestal so as to allow the seat to move about the longitudinal axis of the shaft between a normal seating position and a forwardly inclined position wherein the seat is so located that the horizontal distance between the seat and the rear vertical edge of the door opening is increased to thereby allow access to the rear portion of the motor vehicle van. A torsion spring is wound around the shaft and serves to continuously urge the seat into the forwardly inclined position. To the rear of the shaft, a latch mechanism is provided which connects the seat cushion member to the pedestal and has a locked position for locking the seat in the normal seating position and an unlocked position for allowing the torsion spring to move the seat to the forwardly inclined position. The seat cushion member carries a release member having an inner end connected to the latch mechanism for placing the latter in the unlocked position while the outer end of the release member is formed with a contact member which is located in an area vertically above the step and at a height which allows a person entering the motor vehicle van to engage the contact member with his knee and cause the release member to be shifted from the locked position to the unlocked position.

The objects of the present invention are to provide an improved latch mechanism having a release member which extends laterally from a seat assembly and is located in a position which renders it accessible for operation by the knee of a person entering the vehicle; to provide an improved latch mechanism for a pivotable seat which has a pair of locking members connected in a scissors fashion and adapted to be moved from a locked position to an unlocked position by a release member that is movable along a path that is substantially parallel to the longitudinal axis of each of the lock members; and to provide an improved latch mechanism which maintains a seat in a locked position and includes a pair of overlapping lock members which are continuously Biased into a locked position and are spread apart into an unlocked position through a release member having a contact member which extends laterally outwardly from the seat assembly.

Other objects of the present invention will be apparent from the following detailed description when taken with the drawings in which:

FIG. 4 is a side elevational view showing the seat assembly of FIG. 1;

FIG. 5 is a view taken on lines 5—5 of FIG. 4;

FIG. 6 is a view taken on lines 6—6 of FIG. 4;

FIG. 7 is a view taken on lines 7—7 of FIG. 4;

FIG. 8 is a side elevational view of the motor vehicle van of FIG. 1 showing the seat which forms a part of the seat assembly in a normal seating position and in a forwardly inclined position and;

FIG. 9 is a view taken on lines 9—9 of FIG. 8.

Figure 1:
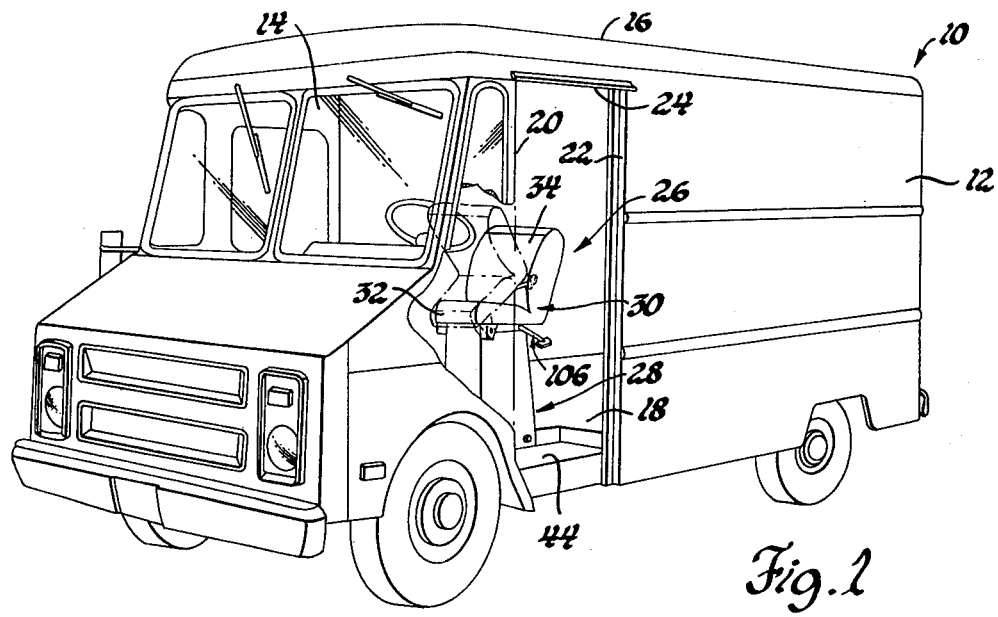
FIG. 1 shows a motor vehicle van incorporating a seat assembly made according to the invention.

Referring to the drawings and more particularly FIG. 1, a motor vehicle van 10 is shown having a body comprising a pair of laterally spaced and vertically orientated side walls, 12 and 14 a roof 16 and a floor portion 18 which serves to carry cargo. Each of the side walls 14 and 16 is provided with a door opening with the door opening in side wall 12 including a pair of horizontally spaced vertical straight edges 20 and 22 and an upper horizontal straight edge 24. As is conventional, an operator's station is provided on the left hand side of the vehicle adjacent the door opening in side wall 12 and, in this instance, includes a driver's seat assembly 26 according to the invention and comprising a box-shaped pedestal 28 the lower end of which is rigidly secured to the floor portion 18 while the upper end carries a seat 30. The seat 30 is formed with the usual seat cushion member 32 and a seat back member 34 which are rigidly interconnected to form a unitary structure while the pedestal 28, as seen in FIGS. 4 and 6, includes side walls 36 and 38, a front wall 40 and a back wall 42. Adjacent the seat assembly 26 and outboard therefrom is a notched opening formed in the floor portion 18 defining a step 44 for facilitating entrance into the motor vehicle van 10.

The motor vehicle van described above is intended to be used commercially for transporting various materials and products and would have access doors provided in the rear end thereof. Nonetheless, during pickup and delivery chores, the vehicle operator would be expected to frequently utilize the side door opening for removing and/or returning items out of or into the van, and as seen in FIG. 8, the door opening has a horizontal distance which approximates the horizontal length of the seat 30. Because of this and due to the proximity of the seat 30 to the door opening, insufficient space would be available between the rear end of the seat 30 and the rear edge 22 of the door opening to permit convenient access to the rear portion or cargo area of the van. As a result, in this instance, the seat 30 is supported in an improved manner whereby the seat 30 can be pivoted from a normal seating position shown in full lines to a forwardly inclined position shown in phantom lines thus increasing the horizontal distance between the seat 30 and the vertical edge 22 and permitting a person to readily move into or out of the rear portion of the motor vehicle 10.

In order to realize the above described pivoting action of the seat 30, the seat cushion member 32 is connected through the guide rails 46 and 48 of a conventional fore and aft seat adjuster mechanism to a rectangular tubular base frame 50. As seen in FIG. 6, the forward end of the base frame 50 rigidly supports a transverse shaft 52 which is rotatably journaled within a pair of axially aligned openings 54 and 56 formed in the side walls 36 and 38 respectively, of the pedestal 28. The shaft 52 serves to pivotally connect the base frame 50 and accordingly the seat 30 to the pedestal 28 and, as mentioned in connection with FIG. 8, allows the seat 30 to pivot as a unit into the forwardly inclined position. A torsion spring 58 is wound about the shaft 52 and has one end 60 thereof extending through an opening 62 formed in the side wall 36 while the other end 64 passes through an opening formed within an adjuster knob 66 which is rotatably carried by the shaft 52 and normally maintained in a fixed position by a pair of set screws 68 and 70. The adjuster knob 66 serves as a means for adjusting the wind-up of spring 58 and thereby varying the pivoting force acting on the seat 30 through the shaft 52. This is accomplished by first placing a long rod within an opening 72 provided in the adjuster knob 66 and holding the rod while loosening the set screws 68 and 70. The knob 66 is then rotated in the appropriate direction for either increasing or decreasing the torsional spring force acting on the shaft 52 after which the set screws 68 and 70 are once again tightened for maintaining the adjuster knob 66 in a fixed relationship with the shaft 52.

Figure 2:
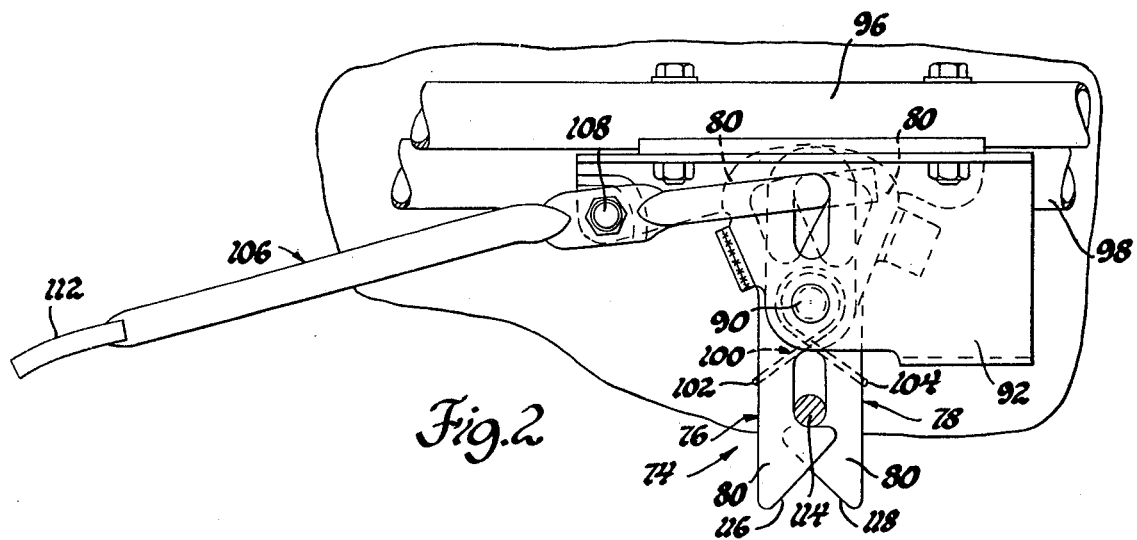
FIG. 2 is an elevation view showing the latch mechanism incorporated with the seat assembly of FIG. 1.

The torsion spring 58 described above continuously urges the shaft 52 in a counterclockwise direction as seen in FIG. 4 and, the seat 30 is maintained in the normal seating position by a latch mechanism 74 which connects an intermediate portion of the base frame 50 to the pedestal 28. In this regard and as seen in FIGS. 2 and 5, the latch mechanism 74 comprises a pair of overlapping lock members 76 and 78 each of which is mirror image of the other and includes a lower portion 80 formed as a J-shaped hook and an upper portion 82 having a triangular opening defined by interconnected walls 84, 86 and 88. Each of the lock members 76 and 78 is supported for pivotal movement by a common pin 90 which, as seen in FIGS. 4 and 7, extends between and is fixed to horizontally spaced and inclined plate members 92 and 94 respectively secured to cross tube members 96 and 98 which are a part of the base frame 50. A compression spring 100 is wound about the pin 90 and has a pair of oppositely extending arms 102 and 104 which respectively wrap around the lower portions 80 of the lock members 76 and 78. The spring 100 serves to bias the lock members 76 and 78 towards each other into the locked position seen in FIG. 2. A release member 106 is pivotally connected to the plate member 92 through a bolt 108 and has an inner end formed with a pair of 909° bends which provide a straight section 110 which extends into and through the openings formed in the upper portions 82 of the lock members 76 and 78. The longitudinal center axis of the section 110 is parallel to the longitudinal center axis of the pin 90 and both of the aforementioned axes lie in a common vertical plane when the release member 106 is in the locked position of FIG. 2 and the unlocked position of FIG. 3. The outer end of the release member 106 rigidly supports a substantially flat contact member 112 which is located outboard from the seat 30 and in an area vertically above the step 44 as seen in FIGS. 8 and 9.

Figure 3:
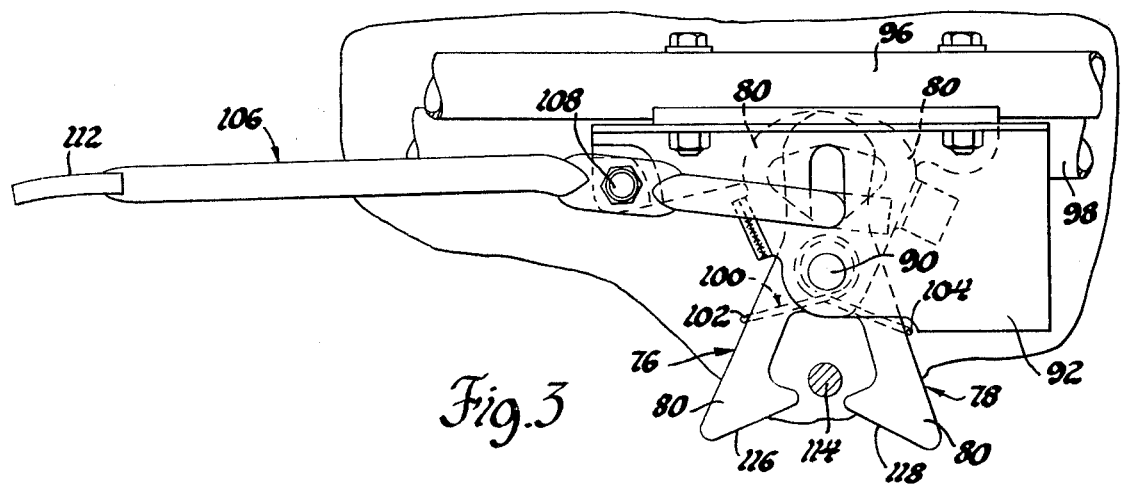
FIG. 3 is a view similar to FIG. 2 but shows the latch mechanism in the unlocked position.

From the above description, it should be apparent that when the latch mechanism 74 is in the locked position of FIG. 2, lock members 76 and 78 retain therebetween a lock bar 114 which is secured to the back wall 42 of the pedestal 28 as seen in FIG. 4, and in this manner, the seat 30 is maintained in the normal seating position. In order to unlock the latch mechanism 74, the contact member 112 is shifted upwardly so as to cause the release member 106 to pivot in a clockwise direction about the bolt 108 as shown in FIG. 3. This results in the section 110 of the release member 106 moving downwardly along the oppositely inclined walls 88 of the lock members 76 and 78 and thereby forcing the lower portions 80 of the lock members to be spread apart against the bias of spring 100 so as to release the lock bar 114. When this occurs, the torsion spring 58 moves the seat 30 from the normal seating position to the forwardly inclined position as seen in FIG. 8. The seat 30 can be returned to the normal seating position by manually pushing it downwardly against the bias of the torsion spring 58, and as the seat 30 approaches the normal seating position, the inclined surfaces 116 and 118 on the lock members 76 and 78, respectively, will contact the lock bar 114 and the latter will cam the lock members to the open position of FIG. 3 after which the spring 100 will return the lock members to the locked position of FIG. 2 to once again retain the lock bar 114.

As mentioned above, the contact member 112 formed at the outer end of the release member 106 is located in an outboard position above the step 44. It will also be noted that the contact member 112 is disposed at a height which makes it readily accessible by the knee portion of the right leg of a person entering the motor vehicle van 10 through the door opening. Thus, if a person has his hands full of packages, he is able to unlock the latch mechanism 74 by raising the contact member 112 with his knee and thereby causing the seat 30 to automatically pivot to the forwardly inclined position so he can gain entrance into the rear of the motor vehicle van 10.

Various changes and modifications can be made in this construction without departing from the spirit of the invention. Such changes and modifications are contemplated by the inventor and he does not wish to be limited except by the scope of the appended claims.

I claim:

1. A latch mechanism for use with a tiltable motor vehicle seat having the forward end thereof supported by a base for movement about a transverse horizontal axis, said latch mechanism comprising a plate member adapted to be secured to said base, a pair of overlapping lock members, a lock bar adapted to be fixed to said base for cooperation with said lock members for locking said seat to said base, pin means mounted on said plate member for pivotally interconnecting said lock members for relative movement in a scissors fashion about a first pivot axis, each of said lock members having a lower portion formed as a J-shaped hook and an upper portion having a triangular opening therein, a compression spring wound about said pin means and having a pair of oppositely extending arms which wrap around the lower portions of said lock members and urge said lower portions towards each other into a locked position with said lock bar, a release member, pivot means offset from the longitudinal axis of each of said lock members and supporting said release member on said plate member for pivotal movement about a second pivot axis that is parallel to said first pivot axis, said release member having an integral inner end formed with a pair of bends and extending into the openings formed in the upper portions of said lock members for causing the lower portions to be spread apart against the bias of said spring when said release member is pivoted about said second axis so as to place the lock members in an unlocked position relative to said lock bar, said inner end having a straight section between said pair of bends, the longitudinal center axis of said straight section being parallel to and lying in a common vertical plane with said first pivot axis when the lock members are in the locked and unlocked positions.

* * * * *